United States Patent Office 3,579,500
Patented May 18, 1971

3,579,500
1-ARYL-3-ALKYLURETIDINEDIONES
Arthur G. Jelinek, Wilmington, Del., assignor to E. I. du Pont de Nemours and Company, Wilmington, Del.
No Drawing. Filed May 28, 1968, Ser. No. 732,558
Int. Cl. C07d 47/00
U.S. Cl. 260—239          9 Claims

ABSTRACT OF THE DISCLOSURE

Compounds useful as herbicides of the formula:

(1)
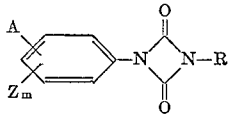

where

A is hydrogen, halogen, alkyl, alkoxy, nitro, cyano, trifluoromethyl, p-chlorophenoxy or m-(tertiary butylcarbamoyloxy);
Z is hydrogen or halogen;
$m$ is 1 or 2, and
R is alkyl, cycloalkyl, methylcyclohexyl, cyclohexylmethyl, cyclopentylmethyl, allyl, methallyl.

Typical is 1-(3,4-dichlorophenyl)-3-methyluretidinedione.

BACKGROUND OF THE INVENTION

Uretidinedione compounds are known in the art to have fungicidal activity. See U.S. Pat. No. 3,223,584 which claims fungicidal utility for 1,3-diphenyluretidinediones. However, until now, herbicidal utility has not been known for this class of compounds. In the present invention it is realized that monoaryl uretidinediones have outstanding herbicidal activity at low use rates.

SUMMARY OF THE INVENTION

This invention relates to uretidinediones useful as herbicides. More specifically, it relates to 1-aryl-3-alkyl-uretidinediones and closely related compounds showing outstanding activity as herbicides. Compounds of this invention are those represented by the following formula:

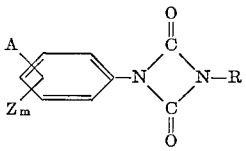

wherein

A is hydrogen, halogen, alkyl of 1 through 4 carbon atoms, alkoxy of 1 through 4 carbon atoms, nitro, cyano, trifluoromethyl, p-chlorophenoxy or m-(tertiarybutylcarbamoyloxy);
Z is hydrogen or halogen;
$m$ is 1 or 2;
R is alkyl of 1 through 4 carbon atoms, cycloalkyl of 3 through 8 carbon atoms, methylcyclohexyl, cyclohexylmethyl, cyclopentylmethyl, allyl or methallyl.

Preferred compounds are those of Formula 1 where R is methyl.

Most preferred because of high activity at low use cost rates are those compounds of Formula 1 where R is methyl, A is hydrogen, chlorine or fluorine, Z is hydrogen or chlorine and $m$ is 1.

PREPARATION OF THE COMPOUNDS

The compounds of this invention can be conveniently synthesized by cyclization of 2-alkyl-4-arylallophanoyl chlorides in an inert solvent with suitable tertiary amines. This can be represented generally as follows:

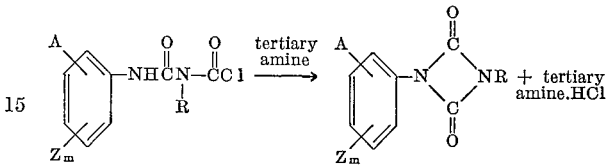

where A, Z, $m$ and R have the same meaning as in Formula 1 above.

The 2-alkyl-4-arylallophanoyl chlorides used in this synthesis are prepared readily from the appropriate 1-alkyl-3-arylureas and phosgene. It is unnecessary to isolate the pure allophanoyl chlorides from solution prior to preparation of the uretidinediones.

Generally, mixing the reactants in approximately stoichiometric proportions or with some excess amine at about 25° C. results in a moderate temperature rise and in rapid precipitation of the amine hydrochloride. On completion of reaction, the mixture is filtered to remove the amine hydrochloride and the filtrate is evaporated to give the product. It is usually a crystalline solid or powder, but in some cases can be a liquid. The products are thermally stable and can be recrystallized from a wide variety of organic solvents. Aliphatic hydrocarbons and lower alcohols are especially useful for this purpose.

The tertiary amines most suitable for the cyclization are the strongly basic, relatively unhindered types. They include the common lower alkyl amines and heterocyclic amines including bicyclo compounds with bridgehead nitrogens. Examples of suitable lower alkyl amines are trimethylamine, ethyldimethylamine, diethylmethylamine, triethylamine and butylidimethylamine. Examples of suitable heterocyclic amines are N-methyl- and N-ethyl-substituted morpholines, pyrrolidines and piperidines. Examples of suitable bicyclic compounds with bridgehead nitrogens are quinuclidine and triethylenediamine.

Solvents most useful for these reactions are the aprotic types such as the aromatic hydrocarbons, cyclic hydrocarbons, certain chlorinated hydrocarbons, ethers, esters and ketones. Examples of suitable solvents are benzene, toluene, cyclohexane, methylcyclohexane, methylene chloride, 1,2-dichloroethane, tetrahydrofuran, ethyl acetate, acetone and methyl ethyl ketone. Generally the reactants and the uretidinedione products are sufficiently soluble in these solvents to enable ready separation from the precipitated amine hydrochlorides. The concentrations of reagents in solvents is not critical. Usually, sufficient solvent is used to enable easy mixing of the slurry of amine hydrochloride formed in the reaction; this usually results in complete solution of product at the completion of reaction.

UTILITY

The compounds of Formula 1 and compositions of this invention employing such compounds are useful for the control of plant growth. Compounds of Formula 1 can be used as crop herbicides or for the control of plants on industrial sites, rights-of-way, tank farms, etc. Weeds also can be controlled in such crops as corn, asparagus, cotton, sugarcane, pineapple and soybeans by the selection of the proper compound, rate, method and time of application as described herein.

COMPOSITIONS

Compositions of this invention are formulated by mixing a compound of this invention with one or more surface active agents.

The surface active agents used in this invention can be wetting, dispersing or emulsifying agents. They act as wetting agents for wettable powders and dusts, as dispersing agents for wettable powders and suspensions and as emulsifying agents for emulsifiable concentrates. Surfactants can also enhance the biological activity of the uretidinediones of this invention. Such surface active agents can include such anionic, cationic and nonionic agents as have heretofore been generally employed in plant control compositions of similar type. Suitable surface active agents are set out, for example, in "Detergents and Emulsifiers Annual—1967" by John W. McCutcheon, Inc. Other surface active agents not listed by McCutcheon but still effective dispersants by virtue of protective colloid action include methyl cellulose, polyvinyl alcohol, hydroxyethylcellulose, and alkyl substituted polyvinyl pyrrolidones.

Small amounts of surface active agents in the range of 0.1 to 20% by weight based on the total weight of the composition is employed.

Suitable surface active agents for use in compositions of this invention include polyethylene glycol esters with fatty and rosin acids, polyethylene glycol ethers with alkyl phenols or with long-chain aliphatic alcohols, polyethylene glycol ethers with sorbitan fatty acid esters, and polyoxyethylenethio ethers. Other suitable surfactants include amine, alkali and alkaline earth salts of alkyl aryl sulfonic acids, amine, alkali and alkline earth fatty alcohol sulfates, dialkyl esters of alkali metal sulfosuccinates, fatty acid esters of amine, alkali and alkaline earth isethionates and taurates, amine, alkali and alkaline earth salts of lignin sulfonic acids, methylated or hydroxyethylated cellulose, polyvinyl alcohols, alkyl substituted polyvinyl pyrrolidone, amine, alkali and alkaline earth salts of polymerized alkylnaphthane sulfonic acids, and long-chain quaternary ammonium compounds. Anionic and nonionic surface active agents are preferred.

Among preferred wetting agents are sodium alkyl naphthalene sulfonates, sodium dioctylsulfosuccinate, sodium dodecyl benzene sulfonate, ethylene oxide condensates with alkylated phenols such as octyl, nonyl and dodecyl phenol, sodium lauryl sulfate, and trimethylnonyl polyethylene glycols. Among preferred dispersing agents are sodium, calcium and magnesium lignin sulfonates, low-viscosity methyl cellulose, low-viscosity polyvinyl alcohol, alkylated polyvinyl pyrrolidone, polymerized alkyl naphthalene sulfonates, sodium N-oleyl or N-lauryl isethionates, sodium N-methyl-N-palmitoyl taurate and dodecylphenol polyethylene glycol esters.

Among preferred emulsifying agents are ethylene oxide adducts of lauric, oleic, palmitic or stearic acid esters of sorbitan or sorbitol, polyethylene glycol esters with lauric, oleic, palmitic, stearic or rosin acids, oil-soluble alkylarylsulfonates, oil-soluble polyoxyethylene ethers with octyl, nonyl and dodecylphenol, polyoxyethylene adducts to long-chain mercaptans, and mixtures of these surfactants.

Compositions of this invention will contain, in addition to surface active agents, solid or liquid inert diluents to produce wettable powders, aqueous suspensions, dusts, granules or emulsifiable liquids as desired. Usually a major amount of the composition (over 50% by weight) will comprise the inert diluent. In some concentrates, less than 50% by weight inert diluent is acceptable.

Wettable powder compositions used with compounds of Formula 1 usually contain inert solid diluents in addition to surfactants. These inert diluents serve several purposes. They can act as grinding aids to prevent mill smear and screen blinding, they can aid rapid dispersion of the mix when placed in water, they can adsorb liquid or low melting solid active material to produce a free flowing solid product, they can prevent agglomeration into lumps upon prolonged hot storage and they can permit preparation of compositions with a controlled amount of active ingredient so that proper dosage is easily measured by the consumer.

Suitable diluents can be either inorganic or organic in origin. These include the natural clays, diatomaceous earth, synthetic mineral fillers derived from silica or silicates, insoluble salts produced by precipitation in fluffy form such as tricalcium phosphate or calcium carbonate, and powdered organic diluents such as shell flours, wood flours, or corn cob flour. Preferred fillers for the compositions of this invention include kaolin clays, attapulgite clay, nonswelling calcium magnesium montmorillonites, synthetic silicas, synthetic calcium and magnesium silicates, and diatomaceous silica.

Wettable powder compositions will normally contain both a wetter and a dispersant. Most preferred for dry wettable powders are those anionic and nonionic surfactants which exist in solid form. Occasionally a liquid, nonionic surfactant, normally considered an emulsifying agent can be used to produce both wetting and dispersion.

Wetting and dispersing agents in wettable powders of this invention, when taken together, will comprise from about 0.5 weight percent to 5.0 weight percent of the total composition. The active component will be present at a concentration of from about 25% to 80% and diluent makes up the balance to 100%. Where needed a corrosion inhibitor or foaming inhibitor may be added at rates of 0.1% to 1.0% with a corresponding reduction in diluent.

Emulsifiable liquids are formulated by combining the compounds of this invention with a suitable emulsifier and an organic liquid with low water solubility. The active component can be completely dissolved in the organic liquid or it can be a finely ground suspension in a non-solvent liquid. Suitable organic liquids include alkylated naphthalenes, xylene, high molecular weight ketones such as isophorones and dibutyl or diamyl ketone, esters such as amyl acetate, and normal or iso paraffins. Most preferred emulsifiers are blends of oil soluble sulfonates and nonionic polyoxyethylene glycol esters or ethers of fatty acids or alkylated phenols.

The active component in emulsifiable concentrates will be present at from ten weight percent to about forty weight percent. Combined emulsifiers will be present at from three weight percent to about ten weight percent and the balance will be an organic carrier liquid or solvent.

Soil treatments with herbicides, either pre- or post-emergence frequently can be most readily applied with granules. Granular products with a compound of Formula 1 can be made in a number of ways. The active materials can be melted or dissolved in a carrier and sprayed upon preformed granules. They can be mixed as powders with suitable diluents and binders, then moistened and granulated, followed by drying. Granules also can be prepared by blending the active ingredients with suitable diluents, compacting the mixture, and breaking the compacted sheet into granules of suitable size. In some instances it is advantageous to compact in the presence of sufficient moisture to render the mix extrudable, followed by drying the formed pellets and granulating to size. Powders also can be applied to coarsely porous granules by tumbling together and applying some non-volatile liquid such as oil, glycol or a liquid nonionic surfactant to act as a binder. Rates of granule disintegration and dispersion of active material in moist soil can be controlled by choice of added surfactants or selection of the binders used to form the granules.

Suitable preformed granules include those made from attapulgite clay, granular expanded vermiculite, ground corn cobs, ground nut shells or preformed kaolinite granules. When active herbicide is placed upon such carriers, the concentration can range from 1% to 25% by weight. However, unless applied from a molten state, it is difficult to prevent segregation of active compound and carrier in concentration ranges above about 10% by weight active compound on preformed granules. When higher concentrations of active are desired best results are obtained by premixing powdered active diluents, binders and surfactants, then granulating so that the active is distributed throughout the granule and not solely upon its surface.

Suitable diluents for the preparation of granules by granulation, compaction or extrusion includes kaolin clays, non-swelling CaMg montmorillonites, and gypsum. Cohesion is improved by the use of a binding agent. Kaolin clays form firm granules if bound together with gelatinous agents such as methylcellulose, natural gums or swelling bentonite. Ca, Mg bentonites require no binder and gypsum can be made to form firm granules with either the addition of plaster of paris or certain salts such as ammonium sulfate, potassium sulfate or urea which form double salts with gypsum.

The active content of formed granules can range from 1–90%, by weight, although 75% by weight active compound represents about the upper level if controlled disintegration of the granule in moist soil is desired. Control of disintegration rate is attained by controlled compaction, or controlled extrusion pressure and by the addition of inert water-soluble components such as sodium sulfate, which can leach away.

Any of the forms of granules described are suitable for use with the compounds of Formula 1. The granule form of choice is dependent upon the intended use. For example, low level application for crabgrass control where active compound need be present only during a relatively short germinating period, a coating held loosely upon expanded vermiculite would be the granule of choice. On the other hand, heavy, sterilizing dosage of long duration can be better applied with high strength, slow disintegrating extruded granules. Usually, granules range in size from 0.25 to 1.4 mm. in diameter.

Aqueous dispersions of herbicides are preferred to wettable powders where only minimum agitation is available in application equipment and accurate dosage is essential. Even the best and finest wettable powder will not disperse completely in water. Small agglomerates remain which settle rapidly. However, when a solid is ground in a water phase, in the presence of dissolved surfactants, each particle develops an adsorbed layer that repels its neighbors and complete dispersion is maintained. This will still not prevent a slow settling to the bottom of stored containers with the formation of a dense "clay" that is difficult to resuspend. A practical aqueous dispersion concentrate must be free from "claying" during an extended shelf life. Acrylic acid polymers and sheared hydrated attapulgite will effectively prevent claying.

Suitable aqueous dispersions of the compounds of Formula 1 are prepared by pebble milling or sand milling the active ingredient, one or more dispersants and an anticlaying component in water until the active particle size is less than 10 microns, preferably less than 5 microns. In climates where freezing is a problem mixtures of glycols and water may be used as the continuous phase.

MIXTURES

Compounds of Formula 1 can be formulated with other herbicidal agents to provide multiple effects.

Typical of other herbicides which can be combined in the ratio of 1:10 to 10:1 by weight of a compound of Formula 1 are:

2,4-dichlorphenoxyacetic acid
2,4,5-trichlorophenoxyacetic acid
2,4,5-trichlorophenoxypropionic acid
3-amino-2,5-dichlorobenzoic acid
2,4-bis(isopropylamino)-6-methylmercapto-s-triazine
1-n-butyl-3-(3,4-dichlorophenyl)-1-methylurea
2-chloro-4,6-bis(ethylamino)-s-triazine
2-chloro-4-ethylamino-6-isopropylamino-s-triazine
3-(p-chlorophenyl)-1,1-dimethylurea
4-(2,4-dichlorophenoxy)-butyric acid
2-methyl-4-chlorophenoxybutyric acid
3-(3,4-dichlorophenyl)-1,1-dimethylurea
N-(3,4-dichlorophenyl)-methacrylamide
3-(3,4-dichlorophenyl)-1-methoxy-1-methylurea
1,2-dihydropyridazine-3,6-dione
2-ethylamino-4-isopropylamino-6-methylmercapto-s-triazine
N,N-dimethyl-$\alpha,\alpha$-diphenylacetamide
sodium 2,4-dichlorophenoxyethylsulfate
octyldodecyl ammonium salts of methylarsonate
disodium methylarsonate
dimethyl ester of tetrachloroterephthalic acid
3-isopropyl-5-bromo-6-methyluracil
3-isopropyl-5-chloro-6-methyluracil
3-sec-butyl-5-bromo-6-methyluracil

APPLICATION

Application rates used for the compounds of Formula 1 to obtain a herbicidal amount vary from one-half to forty kilograms per hectare. One-half to eight kilograms per hectare are preferred for selective weed control and the higher rates are for industrial uses. Applications can be made pre-emergence or post-emergence. Accordingly the active compound is applied to the locus of plant growth. This locus can be the soil surface in the area where plants are growing or will grow. It can mean also the plant surfaces themselves; e.g., leaves, stems and other vegetative parts. The choice of rate and method of application can be easily selected by one skilled in the art. Such variables as soil type, amount of moisture present, wind, time of the year and kind of weeds endemic in the area should be considered in selecting the exact rate of application.

The following additional examples are provided to set forth the invention in further detail. In all instances, unless specifically excepted, all percents or parts given are by weight.

EXAMPLE 1

A solution of 2.5 parts of triethylenediamine in 25 parts of benzene is added rapidly to a stirred solution of 7.0 parts of 4-(3,4-dichlorophenyl)-2-methylallophanoyl chloride in 80 parts of benzene. The temperature rises from 20° C. to 30° C. in the course of 10 minutes. The mixture is stirred for an additional one-half hour, then filtered to remove the by-product hydrochloride salt. Removal of the solvent by evaporation under reduced pressure gives 5.8 parts of 1-(3,4-dichlorophenyl)-3-methyluretidinedione. This solid product shows a melting point at 124° C. The product is characterized by its infrared spectrum. It has a strong carbonyl band at 4.68 microns and no N-H bond in the amino region.

|  | Percent |
|---|---|
| 1-(3,4-dichlorophenyl) - 3 - methyluretidinedione | 75 |
| Alkyl naphthalene sulfonic acid, Na salt | 2 |
| Partially desulfonated lignin sulfonic acid, Na salt | 2 |
| Attapulgite clay | 21 |

The above components are blended and micropulverized until substantially all particles are below 50 microns.

Two kilograms of the active ingredient are suspended in 300 liters of water and applied pre-emergence to a hectare of corn. The treatment controls a number of weeds including crabgrass (Digitaria spp.), foxtail (Setaria spp.), barnyard grass (*Echinochloa crusgalli*), velvetleaf (*Abutilon theophrasti*), ragweed (*Ambrosia trifido*), flower-of-an-hour (*Hibiscus trionium*), lambsquarter (*Chenopodium album*), and pigweed (*Amaranthus retroflexus*). The corn provides a good yield.

EXAMPLES 2–6

The following uretidinedione compounds are made in the manner of the 1-(3,4-dichlorophenyl)-3-methyluretidinedione of Example 1 by substituting a like amount by weight of the indicated allophanoyl chloride for the 4-(3,4-dichlorophenyl)-2-methylallophanoyl chloride of Example 1. The uretidinedione compounds are formulated and applied to plants in the manner of the 4-(3,4-dichlorophenyl)-2-methyluretidinedione of Example 1 in like amount by weight to give like results.

| Ex. No. | Allophanoyl chloride | Uretidinedione | Melting point, °C. |
|---|---|---|---|
| 2 | 2-methyl-4-phenyl | 1-methyl-3-phenyl | 76 |
| 3 | 2-ethyl-4-phenyl | 1-ethyl-3-phenyl | 32 |
| 4 | 4-(m-chlorophenyl)-2-methyl | 1-(m-chlorophenyl)-3-methyl | 77 |
| 5 | 2-methyl-4-(α,α,α-trifluoro-m-tolyl) | 1-methyl-3-(α,α,α-trifluoro-m-tolyl) | 74 |
| 6 | 4-(p-chlorophenyl)-2-methyl | 1-(p-chlorophenyl)-3-methyl | 124 |

EXAMPLE 7

To a stirred solution of 6.0 parts of trimethylamine dissolved in 100 parts of acetone, maintained at 25° C., is added rapidly a solution of 19.5 parts of 4-(o-fluorophenyl)-2-methylallophanoyl chloride and 100 parts of acetone. The temperature rises and trimethylamine hydrochloride precipitates. The mixture is further stirred for one hour at room temperature and then filtered. Evaporation of the solvent gives the viscous, nearly colorless, liquid product, 1-(o-fluorophenyl)-3-methyluretidinedione. The structure is confirmed by chemical analysis (C, H, N) and infrared spectroscopy.

| | Percent |
|---|---|
| 1-(o-fluorophenyl)-3-methyluretidinedione | 25 |
| Blend of nonylphenol, polyethylene oxide and oil soluble salts of dodecyl benzene sulfonic acid | 5 |
| Alkylated naphthalenes, principally methyl naphthalene | 70 |

The above composition is made by simple mixing of the mutually soluble components. The final product can be emulsified in water and sprayed or diluted directly with herbicidal oils and applied.

The composition is diluted with herbicidal oil to provide a 5% concentration. The mixture is sprayed to run off on growing vegetation around guard rail poles, sign posts and power poles along a highway. This is preferably done while highway shoulders are being mowed. The treatment results in kill of the vegetation where application is made and subsequent suppression of plant growth for a season or more.

EXAMPLES 8–15

The following compounds are made in the manner of the 1-(o-fluorophenyl)-3-methyluretidinedione of Example 7 by substituting a like amount by weight of the indicated allophanoyl chloride for the 4-(o-fluorophenyl)-2-methylallophanoyl chloride of Example 7 using a like amount by weight of trimethylamine or other tertiary amine. The uretidinedione compounds are separately formulated and applied to vegetation in the manner of the 1-(o-fluorophenyl)-3-methyluretidinedione of Example 7 in like amount by weight to give like results.

| Ex. No. | Allophanoyl chloride | Uretidinedione |
|---|---|---|
| 8 | 4-(p-butoxyphenyl)-2-isopropyl | 1-(p-butoxyphenyl)-3-isopropyl |
| 9 | 2-tert-butyl-4-phenyl | 1-tert-butyl-3-phenyl |
| 10 | 2-ethyl-4-p-tolyl | 1-ethyl-3-p-tolyl |
| 11 | 4-(3-chloro-4-methoxyphenyl)-2-methyl | 1-(3-chloro-4-methoxyphenyl)-3-methyl |
| 12 | 2-hexahydrobenzyl-4-phenyl | 1-hexahydrobenzyl-3-phenyl |
| 13 | 2-allyl-4-(p-tert-butylphenyl) | 1-allyl-3-(p-tert-butylphenyl) |
| 14 | 2-(2-methylcyclohexyl)-4-phenyl | 1-(2-methylcyclohexyl)-3-phenyl |
| 15 | 2-cyclopropyl-4-(p-ethylphenyl) | 1-(cyclopropyl-3-(p-ethylphenyl) |

EXAMPLE 16

To a stirred solution of 19.0 parts of 2-(2-methallyl)-4-phenylallophanoyl chloride and 250 parts of 1,2-dichloroethane is rapidly added at 15° C. 11.0 parts of N-methylpiperidine. The temperature rises moderately as N-methylpiperidine hydrochloride precipitates. After the vigor of the reaction subsides, the slurry is filtered to remove the salt. Evaporation of the filtrate under reduced pressure gives in good yield the solid product, 1-(2-methallyl)-3-phenyluretidinedione.

| | Percent |
|---|---|
| 1-(2-methallyl)-3-phenyluretidinedione | 25.5 |
| Sodium sulfate, anhydrous | 10.0 |
| Alkylnaphthalene sodium sulfonate | 1.0 |
| Ca, Mg bentonite | 63.5 |

The above components are mixed and hammer-milled, then moistened with 12–15% water and extruded through 1/8″ diameter holes while cutting knives cut the extrusions to approximately 1/8″ long pellets which are then dried. If granules rather than pellets are desired, the knives are operated at higher speed to form thin discs which can be readily granulated to 20–60 mesh when dry.

This composition is applied to the soil uniformly immediately after planting cotton at a rate of 3 kilograms per hectare active material with a conventional fertilizer spreader or granule applicator. The treatment results in excellent control of problem weeds such as sicklepod (*Cassia obtusifolia*), coffeeweed (*Daubentonia texana*), crabgrass and annual morning glory (Iponea spp.). No injury is exhibited by the cotton crop.

EXAMPLES 17–25

The following uretidinedione compounds are prepared in the manner of the 1-(2-methallyl)-3-phenyluretidinedione of Example 16 by substituting a like amount by weight of the indicated allophanoyl chloride for the 2-(2-methallyl)-4-phenylallophanoyl chloride of Example 16. The uretidinediones are formulated and applied to soil one at a time in the manner of the 1-(2-methallyl)-3-phenyluretidinedione of Example 16 in like amount by weight to give like results.

| Ex. No. | Allophanoyl chloride | Uretidinedione |
|---|---|---|
| 17 | 2-allyl-4-(o-chlorophenyl) | 1-allyl-3-(o-chlorophenyl) |
| 18 | 4-(m-tert-butylcarbamoyloxyphenyl)-2-methyl | 1-(m-tert-butylcarbamoyloxyphenyl)-3-methyl |
| 19 | 4-(p-cyanophenyl)-2-ethyl | 1-(p-cyanophenyl)-3-ethyl |
| 20 | 2-methyl-4-(m-nitrophenyl) | 1-methyl-3-(m-nitrophenyl) |
| 21 | 4-(p-chlorophenoxyphenyl)-2-methyl | 1-(p-chlorophenoxyphenyl)-3-methyl |
| 22 | 4-(3,4-dichlorophenyl)-2-cyclooctyl | 1-(3,4-dichlorophenyl)-3-cyclooctyl |
| 23 | 2-allyl-4-phenyl | 1-allyl-3-phenyl |
| 24 | 4-(p-bromophenyl)-2-methyl | 1-(p-bromophenyl)-3-methyl |
| 25 | 4-(5-chloro-2-methoxyphenyl)-2-propyl | 1-(5-chloro-2-methoxyphenyl)-3-propyl |

EXAMPLE 26

| | Percent |
|---|---|
| 1-methyl-3-phenyluretidinedione | 50 |
| Dioctyl sodium sulfosuccinate | 2 |
| Oleyl ester of sodium isethionate | 2 |
| Synthetic fine silica | 26 |
| Kaolin clay | 20 |

The composition is prepared by blending the ingredients and grinding in a pin mill until substantially all of the powder can be washed through a screen having openings of 0.074 mm. (200 mesh).

This composition is applied to railroad rights-of-way at a rate of 20 kilograms active ingredient per hectare in 50 gallons of water before weed seeds germinate. The treatment results in season-long control of annual and perennial weeds, leaving the rail line free of vegetation and obviates potential fire and safety hazards.

EXAMPLE 27

| | Percent |
|---|---|
| 1-ethyl-3-phenyluretidinedione | 30 |
| Dodecylbenzenesulfonic acid, Na salt | 1 |
| Sodium lignin sulfonate | 2 |
| Diatomaceous silica | 67 |

The temperature of the low-melting active component is raised to about 50° C., then sprayed upon a tumbling mixture of the remaining components. The resulting product is then passed once through a hammer mill to de-agglomerate any lumps.

The composition is extended with water containing 0.5% dodecyl ether of polyethylene glycol and sprayed as a post-emergence spray on cotton at a rate of 2 kilograms active per hectare. The spray is directed so as to contact weeds such as seedling Johnsongrass and crabgrass growing beneath the cotton. The treatment results in excellent post-emergence control of the grasses while the chemical contacting the soil provides pre-emergence control of weeds such as mustard (Brassica spp.), sida (Sida spp.), Johnsongrass, barnyard grass, crabgrass and pigweed which have not yet germinated.

EXAMPLES 28–31

The following compounds are separately substituted one at a time for the 1-ethyl-3-phenyluretidinedione of Example 27 in like amount by weight. Application to weeds in like amount by weight provides like activity.

(28) 1-(o-fluorophenyl)-3-methyluretidinedione.
(29) 1-(p-butoxyphenyl)-3-isopropyluretidienedione.
(30) 1-phenyl-3-tert-butyluretidinedione.
(31) 1-ethyl-3-p-tolyluretidinedione.

EXAMPLE 32

| | Percent |
|---|---|
| 1-(p-cyanophenyl)-3-ethyluretidinedione | 80 |
| Sodium lauryl sulfate | 1.5 |
| Polymerized alkyl naphthalene sulfonic acid, Na salt | 2.0 |
| Synthetic sodium silico aluminate | 17.5 |

The composition is prepared by blending the ingredients and hammer milling in a micropulverizer until substantially all of the active ingredient has a particle size less than 20 microns.

This wettable powder is extended with water and sprayed on dormant alfalfa, at a rate of 2 kilograms active ingredient per hectare. This treatment results in control of biennial weeds such as field cress (Rorippa spp.), yellow rocket (Barbarea vulgaris), dandelion (Taraxacum officinale), seedling burdock (Articum minus), tall thistle (Circium altissimum) and winter annuals such as chickweed (Stellaria media), field peppergrass (Lepidium campestre) and downy bromegrass (Bromus tectorum).

EXAMPLE 33

| | Percent |
|---|---|
| 1-(p-butoxyphenyl)-3-isopropyluretidinedione | 5 |
| Trimethylnonylether of polyethylene oxide | 1 |
| 20–40 mesh attapulgite granules | 94 |

The active and surfactant are warmed together to give a low viscosity solution which is then sprayed upon the absorptive granules. Any of the lower-melting members of the compounds of this invention can be used to form granules in this manner.

The granules are applied at a rate of 3 kilograms per hectare active ingredient to soil in which nursery plants are propagated. Application is made with a fertilizer spreader immediately after cultivation between the rows. The treatment provides season-long control of weeds such as pigweed, lambsquarter, mustard, crabgrass and chickweed. No injury to the nursery material is experienced.

EXAMPLE 34

| | Percent |
|---|---|
| 1-(3,4-dichlorophenyl)-3-methyluretidinedione | 30 |
| Ca, Mg lignin sulfonate | 15 |
| Sodium pentachlorophenate | 0.5 |
| Hydrated attapulgite clay | 2.0 |
| Water | 52.5 |

The above components are mixed together, then pebble-milled or sand-milled until all particles are below 10 microns.

One kilogram of the active ingredient is suspended in 250 liters of water and applied pre-emergence to a hectare of soybeans. The treatment provides control of crabgrass, pigweed, beggartick (Bidera frondosa), buttonweed (Diodia virginiana), jimsonweed (Datua stramonium), black nightshade (Solanum nigrum) and other weeds. The soybeans grow and provide a good yield.

EXAMPLE 35

| | Percent |
|---|---|
| 1-(3,4-dichlorophenyl)-2-methyluretidinedione | 10 |
| Alkyl naphthalene sulfonic acid, Na salt | 0.5 |
| Sodium lignin sulfonate | 0.5 |
| Pulverized gypsum | 80 |
| Ammonium sulfate | 9 |

The above components are blended and ground, then moistened with water, granulated, dried and pulverized to 20–40 mesh in the manner described in U.S. Pat. No. 3,168,437.

The granules can be used for weed control in cotton. They are applied at a rate of 4 kilograms active per treated hectare in a 35 centimeter wide band directly over the row. These granules are then incorporated into the top two centimeters of soil with a gandy wheel or other incorporating device mounted directly in front of the cotton planter. This treatment provides excellent control of weeds such as crabgrass, barnyard grass, Johnsongrass seedlings (Sorghum halepense), mustard, sicklepod (Cassia obtusifolia) and cocklebur (Xanthium sp.). No decrease in cotton yield is experienced.

What is claimed is:
1. A compound of the formula:

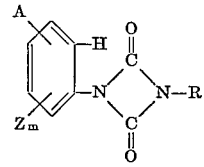

wherein

A is selected from the group consisting of hydrogen, halogen, alkyl of 1 through 4 carbon atoms, alkoxy of 1 through 4 carbon atoms, nitro, cyano, trifluoromethyl, p-chlorophenoxy, and m-(tert-butylcarbamoyloxy);

Z is selected from the group consisting of hydrogen and halogen;

$m$ is a whole integer less than 3;

R is selected from the group consisting of alkyl of 1 through 4 carbon atoms, cycloalkyl of 3 through 8 carbon atoms, methylcyclohexyl, cyclohexylmethyl, cyclopentylmethyl, allyl, and methallyl.

2. A compound according to claim 1 in which R is methyl.

3. A compound according to claim 1 in which R is methyl, A is selected from the group consisting of hydrogen, chlorine and fluorine, Z is selected from the group consisting of hydrogen and chlorine and $m$ is one.

4. A compound according to claim 1 which is 1-(3,4-dichlorophenyl)-3-methyluretidinedione.

5. A compound according to claim 1 which is 1-methyl-3-phenyluretidinedione.

6. A compound according to claim 1 which is 1-(m-chlorophenyl)-3-methyluretidinedione.

7. A compound according to claim 1 which is 1-methyl-3-(α,α,α-trifluoro-m-tolyl)uretidinedione.

8. A compound according to claim 1 which is 1-(o-fluorophenyl)-3-methyluretidinedione.

9. A compound according to claim 1 which is 1-methyl-3-(m-tert-butylcarbamoyloxy)uretidinedione.

References Cited

UNITED STATES PATENTS

| | | |
|---|---|---|
| 2,895,817 | 7/1959 | Luckenbaugh. |
| 2,977,360 | 3/1961 | Dixon _____ 260—239 |
| 3,223,584 | 12/1965 | Luckenbaugh et al. |

ALTON D. ROLLINS, Primary Examiner

U.S. Cl. X.R.

71—92, 93; 260—479, 544, 553